(12) United States Patent
Hayashi

(10) Patent No.: US 8,219,132 B2
(45) Date of Patent: Jul. 10, 2012

(54) COMMUNICATION SYSTEM, BASE STATION APPARATUS AND COMMUNICATION METHOD

(75) Inventor: Hiroki Hayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 415 days.

(21) Appl. No.: 12/624,598

(22) Filed: Nov. 24, 2009

(65) Prior Publication Data

US 2010/0130242 A1 May 27, 2010

(30) Foreign Application Priority Data

Nov. 26, 2008 (JP) ................................. 2008-300309

(51) Int. Cl.
*H04Q 7/20* (2006.01)
(52) U.S. Cl. .................. 455/517; 455/569.2; 455/550.1; 455/403; 455/432.1; 455/345; 701/1; 701/23; 701/24
(58) Field of Classification Search ............... 455/517, 455/550.1, 569.2, 445, 557, 561, 432.1, 500, 455/571.1, 575.9, 90.3, 403, 422.1, 426.1, 455/426.2, 456.1–457, 412.1, 412.2, 95, 455/99, 344, 345; 701/1, 23, 24, 32, 200, 701/213
See application file for complete search history.

(56) References Cited

U.S. PATENT DOCUMENTS

| 2004/0072581 A1* | 4/2004 | Tajima et al. .............. 455/456.1 |
| 2006/0149463 A1* | 7/2006 | Machii et al. ................. 701/209 |

FOREIGN PATENT DOCUMENTS

| JP | 2004-364006 | 12/2004 |
| JP | 2007-088737 | 4/2007 |

* cited by examiner

*Primary Examiner* — Keith Ferguson
(74) *Attorney, Agent, or Firm* — Katten Muchin Rosenman LLP

(57) ABSTRACT

A communication method, for use in a communication system that performs radio communication between a number of vehicle-mounted terminal devices and a base station device, includes transmitting, by each of the vehicle-mounted terminal devices, vehicle-mounted device information thereof, and lastly-accessed identification information indicating a base station device that was in the radio communication with a vehicle-mounted terminal device just before when the communications therewith is cut off and authenticating, by the base station device, when there is a match between the transmitted lastly-accessed identification information and the identification information of the base station device stored in the base station device, based on the vehicle-mounted device information of the vehicle-mounted terminal devices stored in the base station device not entirely but partially, and the vehicle-mounted device information transmitted by each of the vehicle-mounted terminal devices.

14 Claims, 15 Drawing Sheets

FIG. 5

| SERIAL NUMBER | VEHICLE IDENTIFICATION NUMBER | VEHICLE-MOUNTED DEVICE NUMBER | NUMBER PLATE | LAST AUTHENTICATION TIME | AUTHENTICATION ROUTE |
|---|---|---|---|---|---|
| 0000000001 | ABC123 | 987XYZ654 | F12-645 CALIFORNIA | 20080101_1010 | A→C→Z→D |
| 0000000002 | AWQ111 | 999AAA555 | G70-509 MONTANA | 20080111_1312 | D→F→T→P |
| ... | | | | | |
| 0999999999 | XYY788 | 111AAA998 | Z23-155 MINNESOTA | 20080210_1715 | S→I→J→W |
| 1000000000 | XYZ789 | 111AAA999 | A56-438 MICHIGAN | 20080202_2020 | X→Y→Q |

FIG. 6

| SERIAL NUMBER | VEHICLE IDENTIFICATION NUMBER | VEHICLE-MOUNTED DEVICE NUMBER | NUMBER PLATE |
|---|---|---|---|
| 001 | AGH111 | 999XXX111 | F33-963 WISCONSIN |
| . | | | . |
| 245 | XXX999 | 555YYY333 | N77-469 MICHIGAN |

COMMUNICATION SYSTEM, BASE STATION APPARATUS AND COMMUNICATION METHOD

CROSS-REFERENCE TO RELATED APPLICATIONS

This application is based upon and claims the benefit of priority of prior Japanese Patent Application No. 2008-300309, filed on Nov. 26, 2008, the entire contents of which are incorporated herein by reference.

FIELD

Certain aspects of the present invention discussed herein are related to a communication system, base station apparatus and communication method.

BACKGROUND

There has been developed a vehicle-to-vehicle communication system. An exemplary previous vehicle-to-vehicle communication system includes a vehicle-mounted terminal for use in a vehicle, a plurality of relay stations, and a relay station management server. The relay station management server serves to receive current information about the terminal, and based on the current information about the terminal, search for which of the relay stations is available next for communication with the vehicle-mounted device. The relay station management server then calculates an estimated time for switching from one relay station to another, and forwards the calculation result to the relay station(s) concerned. (for example, Japanese laid open patent publication 2004-364006).

There is another type of vehicle-to-vehicle communication system, which is configured to include a local certificate authority, a base station, and a vehicle-mounted terminal. In such a vehicle-to-vehicle communication system, the base station distributes an area certificate to the vehicle-mounted terminal at predetermined intervals, and while receiving the area certificate being the most recent and reliable, the vehicle-mounted terminal authenticates information coming from the base station using the area certificate. (for example, Japanese laid open patent publication 2007-88737).

The concern about such a previous technology described in Japanese laid open patent publication 2004-364006 is that there is no description of how a vehicle makes an initial network entry at a high speed. Moreover, with the previous technology described in Japanese laid open patent publication 2007-88737, there is no description of how to authenticate each vehicle.

SUMMARY

Accordingly, in an aspect, an object of the invention is to reduce the time for completing an authentication process.

According to a certain aspect of the invention, in a communication system that performs radio communication between a plurality of vehicle-mounted terminal devices and a base station device, the base station device is configured to include a transmitting unit, a storage unit, a receiving unit, and a processing unit. The transmitting unit serves to transmit identification information of the base station device, and the storage unit serves to store vehicle-mounted device information of the vehicle-mounted terminal devices not entirely but partially. The receiving unit receives, from a vehicle-mounted terminal device, vehicle-mounted device information of the vehicle-mounted terminal device, and lastly-accessed identification information. The lastly-accessed identification information indicates a base station device that was in radio communication with the vehicle-mounted terminal device just before when the radio communication therewith is cut off. The processing unit performs, when the received lastly-accessed identification information matches with the identification information in the storage unit, an authentication based on the received vehicle-mounted device information and the vehicle-mounted device information stored in the storage unit. The vehicle-mounted terminal device is configured to include a receiving unit that receives the identification information of the base station device, and a transmitting unit that transmits the vehicle-mounted device information and the lastly-accessed identification information to the base station device.

According to a certain aspect of the invention, a base station device that performs radio communication with a plurality of vehicle-mounted terminal devices is configured to include a transmitting unit, a storage unit, a receiving unit, and a processing unit. The transmitting unit serves to transmit identification information of the base station device, and the storage unit serves to store vehicle-mounted device information of the vehicle-mounted terminal devices not entirely but partially. The receiving unit receives, from a vehicle-mounted terminal devices, vehicle-mounted device information of the vehicle-mounted terminal device, and lastly-accessed identification information. The lastly-accessed identification information indicates a base station device that was in radio communication with the vehicle-mounted terminal device just before when the radio communication therewith is cut off. The processing unit performs, when the receives lastly-accessed identification matches with the identification information in the storage unit, an authentication based on the received vehicle-mounted device information and the vehicle-mounted device information stored in the storage unit.

According to a certain aspect of the invention, a communication method is used in a communication system that performs radio communication between a plurality of vehicle-mounted terminal devices and a base station device, the vehicle-mounted terminal devices each transmit, to the base station device, vehicle-mounted device information thereof, and lastly-accessed identification information. The lastly-accessed identification information indicates a base station device that was in the radio communication with the vehicle-mounted terminal device just before when the radio communication therewith is cut off. When the lastly-accessed identification information received from the vehicle-mounted terminal device matches with the identification information of the base station device stored therein, the base station device performs an authentication based on the vehicle-mounted device information stored in the base station device of the vehicle-mounted terminal devices not entirely but partially, and the vehicle-mounted device information provided by the vehicle-mounted terminal devices.

It is to be understood that both the foregoing general description and the following detailed description are exemplary and explanatory and are not restrictive of the invention, as claimed.

BRIEF DESCRIPTION OF DRAWINGS

FIG. 5 illustrates an exemplary database stored in the authentication server of FIG. 1;

FIG. 6 illustrates another exemplary database stored in the small-sized authentication server of FIG. 4;

DESCRIPTION OF EMBODIMENTS

Embodiments for carrying out present invention are described with reference to the figures.

Figure 1:
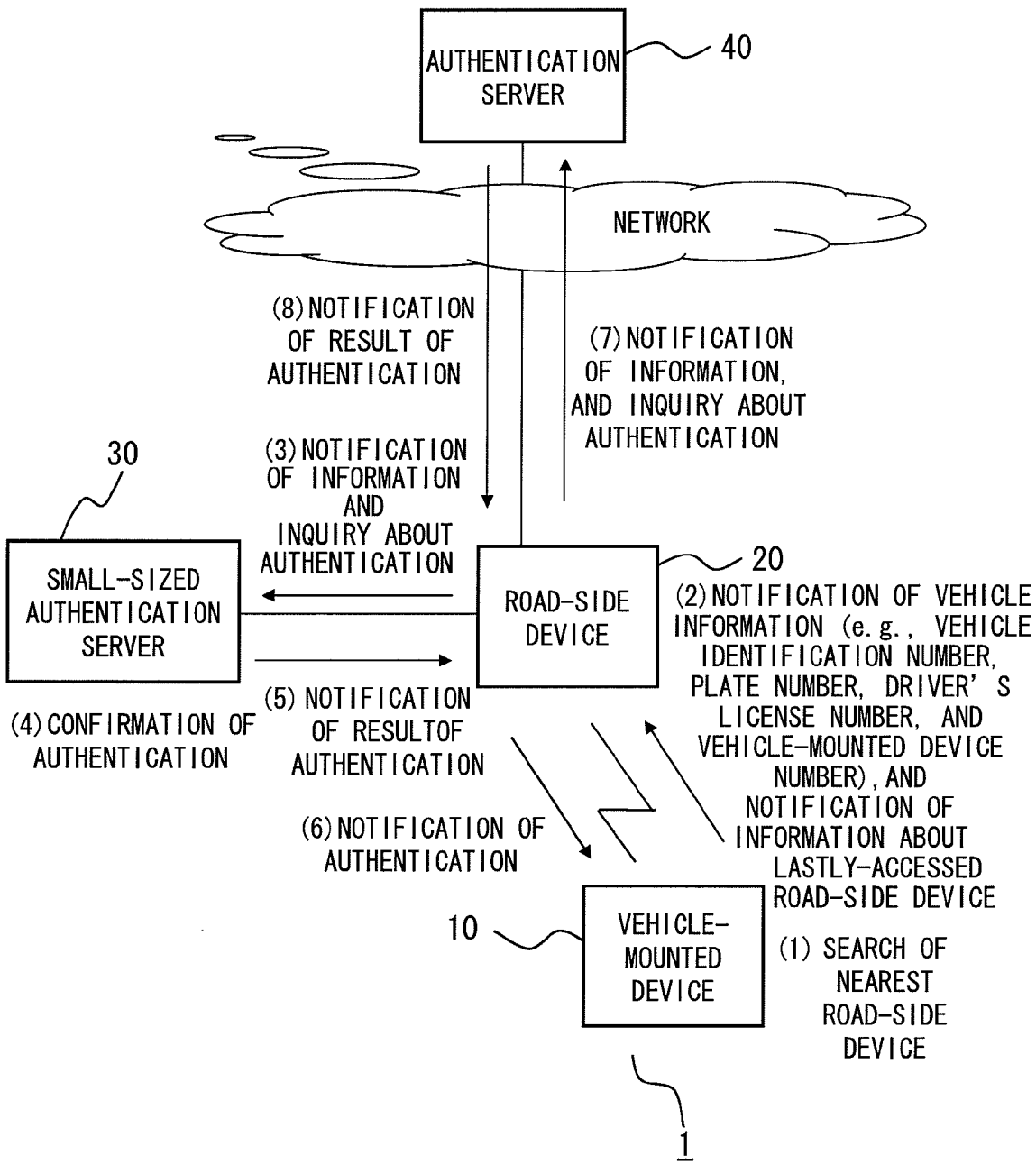
FIG. 1 illustrates an exemplary configuration of a communication system.

FIG. 1 is a diagram illustrating an exemplary configuration of a communication system 1. The communication system 1 includes a vehicle-mounted device (or vehicle-mounted terminal device) 10, a road-side device (example of base station device) 20, a small-sized authentication server 30 provided to the road-side device 20, and an authentication server 40.

The vehicle-mounted device 10 is provided to a vehicle, for example, and performs radio communication with the road-side device 20. The vehicle-mounted device 10 is also in charge of information transmission to the road-side device 20, i.e., vehicle-mounted device information, and lastly-accessed road-side device information. The vehicle-mounted device 10 will be described in detail later. The vehicle-mounted device information includes the vehicle identification number of the vehicle within which the vehicle-mounted device is provided, the plate number of the vehicle, the driver's license number, the number of the vehicle-mounted device, and others.

The road-side device 20 is connected with the small-sized authentication server 30, and asks the small-sized authentication server 30 to authenticate a vehicle concerned. For use of the authentication, the road-side device 20 forwards, to the small-sized authentication server 30, information provided by the vehicle-mounted device 10 thereabout, i.e., vehicle-mounted device information and others. The road-side device 20 will be described in detail later.

The small-sized authentication server 30 stores therein the vehicle-mounted device information and others, and executes an authentication process to the vehicle concerned, for example. This authentication process is executed based on the vehicle-mounted device information and others provided by the vehicle-mounted device 10 thereabout, for example, when the lastly-accessed road-side device information provided by the vehicle-mounted device 10 shows a match with information about the road-side device 20, i.e., road-side device information. The small-sized authentication server 30 is disposed at a position close to the road-side device 20, for example. The small-sized authentication server 30 will be described in detail later. Such road-side device information is for use to distinguish the road-side device 20 from other road-side devices, and includes the serial number and address of the road-side device 20, for example.

The authentication server 40 is connected to the road-side device 20 over a network. The authentication server 40 executes an authentication process to a vehicle concerned in response to a request coming from the small-sized authentication server 30. Such an authentication process is executed when the lastly-access road-side device information is not about the road-side device 20, for example.

As an alternative configuration, in the communication system 1, a plurality of road-side devices 20 may be connected to the authentication server 40 over a network.

Described next is the entire operation of the communication system 1 by referring to FIG. 1. The vehicle-mounted device 10 communicates with the road-side device 20 after searching which road-side device 20 is located closest. The vehicle-mounted device 10 makes a notification to the road-side device 20 about a request for network entry, the vehicle-mounted device information, and the lastly-accessed road-side device information.

After receiving such information, the road-side device 20 forwards the information to the small-sized authentication server 30.

When the provided lastly-accessed road-side device information shows a match with the road-side device information about the road-side device 20, the small-sized authentication server 30 executes an authentication process to the vehicle concerned. The authentication result is notified to the road-side device 20.

The road-side device 20 then forwards the notification about the authentication to the vehicle-mounted device 10.

On the other hand, when the provided lastly-accessed road-side device information does not show a match with the road-side device information about the road-side device 20, for example, the small-sized authentication server 30 notifies such a result to the road-side device 20. Upon reception of such a result, the road-side device 20 forwards the vehicle-mounted device information or others to the authentication server 40, thereby asking the authentication server 40 to authenticate the vehicle concerned. The authentication server 40 accordingly executes the authentication process to the vehicle concerned, and then notifies the authentication result to the road-side device 20. The road-side device 20 forwards the notification about the authentication to the vehicle-mounted device 10.

Figure 2:
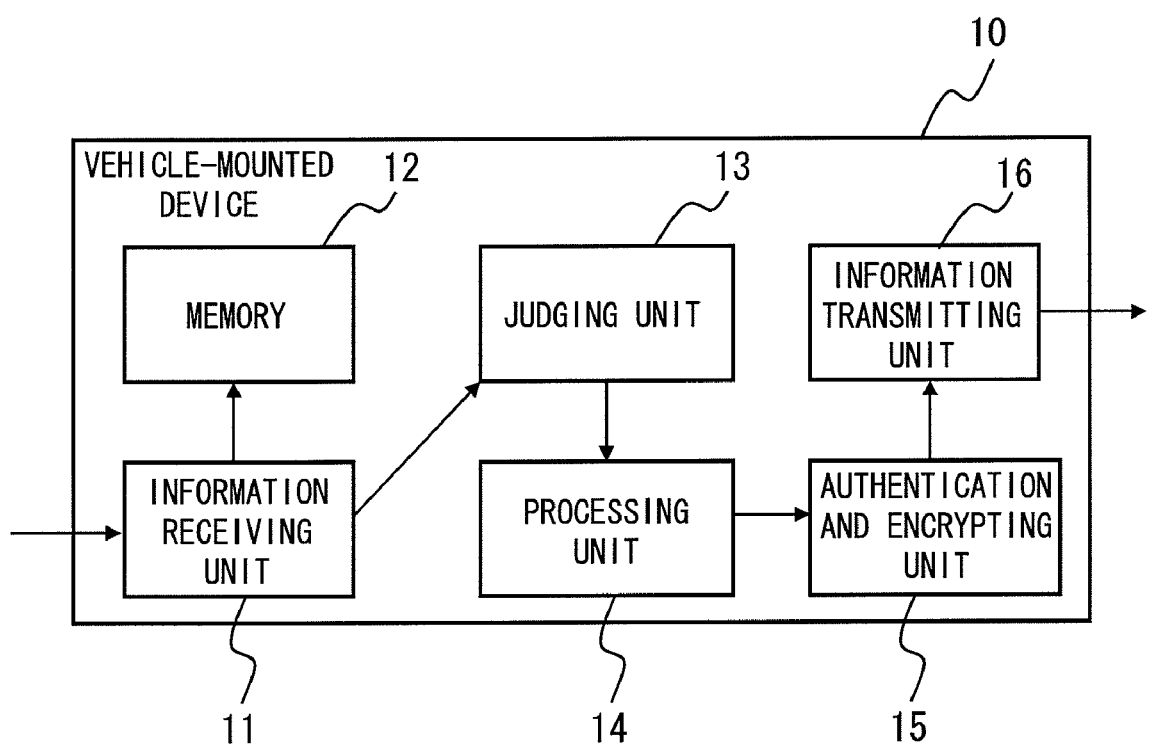
FIG. 2 illustrates an exemplary configuration of a vehicle-mounted device.

FIG. 2 is a diagram illustrating an exemplary configuration of the vehicle-mounted device 10. The vehicle-mounted device 10 is configured to include an information receiving unit 11, a memory 12, a judging unit 13, a processing unit 14, an authentication and encrypting unit 15, and an information transmitting unit 16.

The information receiving unit 11 is provided with information from the road-side device 20, e.g., road-side device information. The information receiving unit 11 forwards the provided information to the memory 12 and the judging unit 13.

The memory 12 serves to store the provided information, the vehicle-mounted device information, and others. The judging unit 13 makes various judgments about the provided information and others. The processing unit 14 executes various types of processes to the provided information and others. The authentication and encrypting unit 15 executes an authentication process and an encryption process to the information completed with the processes as such if needed. The information transmitting unit 16 forwards any information completed with the encryption process to the road-side device 20.

Figure 3:
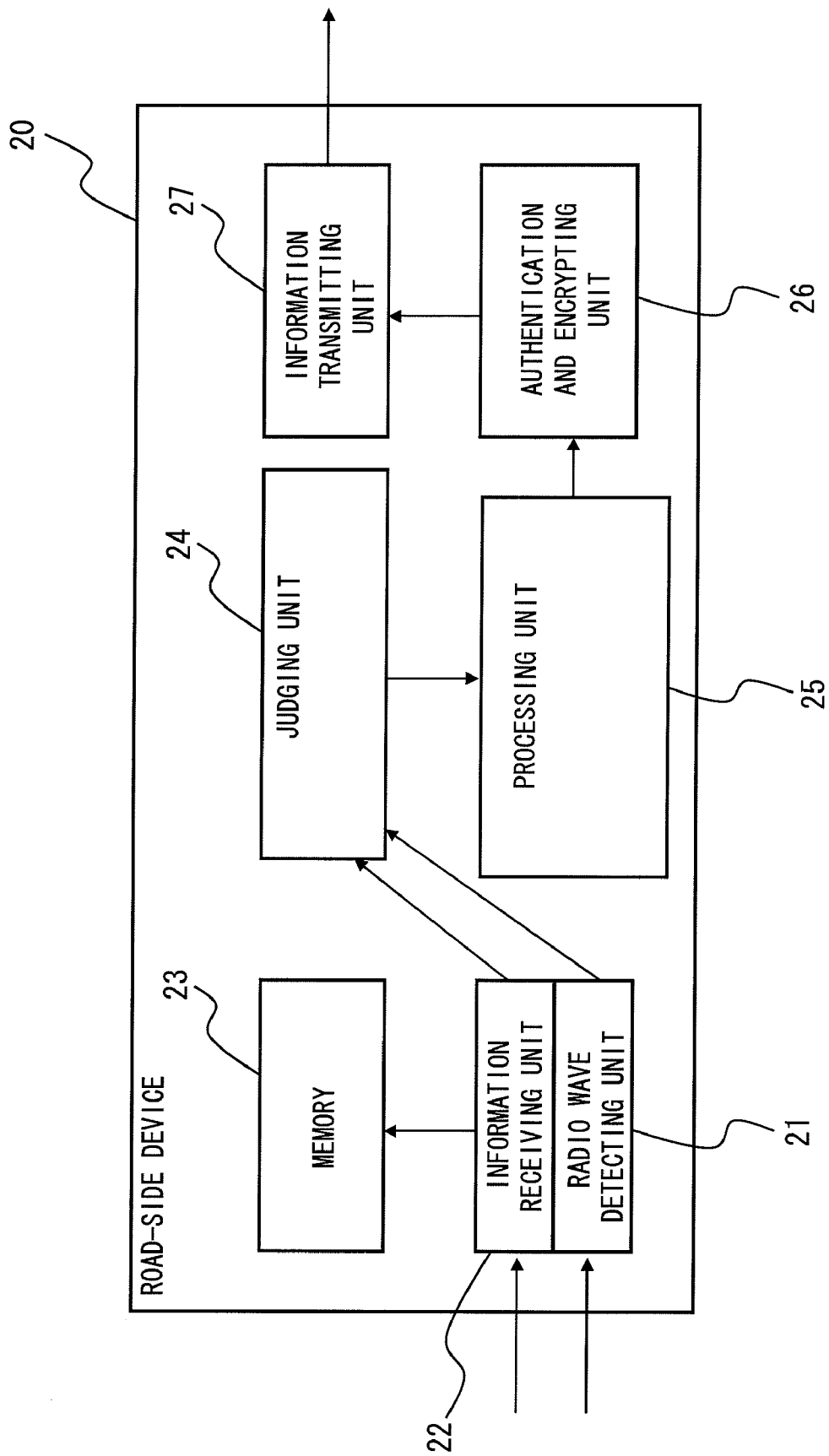
FIG. 3 illustrates an exemplary configuration of a road-side device.

FIG. 3 is a diagram illustrating an exemplary configuration of the road-side device 20. The road-side device 20 is configured to include a radio wave detecting unit 21, an information receiving unit 22, a memory 23, a judging unit 24, a processing unit 25, an authentication and encrypting unit 26, and an information transmitting unit 27.

The radio wave detecting unit 21 detects any radio waves coming from the vehicle-mounted device 10, and extracts the incoming information for transmission to the memory 23 or the judging unit 24.

The information receiving unit 22 is provided with information from the authentication server 40 or any nearby road-side device (will be described later), and forwards the provided information to the memory 23 or the judging unit 24.

The judging unit 24 makes a judgment about the communication state or others based on the information provided by the radio wave detecting unit 21 and the information receiving unit 22.

The processing unit 25 uses as a basis the judgment result provided by the judgment unit 24 to go through various types of processes when the communication with the vehicle-mounted device 10 is cut off, e.g., process of forwarding a command to store the information lastly provided.

The authentication and encrypting unit 26 executes an authentication process and an encryption process with respect to any information in need in the information provided by the information receiving unit 22 and the information detected by the radio wave detecting unit 21.

The information transmitting unit 27 forwards the information provided by the authentication and encrypting unit 26 to the authentication server 40 via the vehicle-mounted device 10, the small-sized authentication server 30, or over the network. Note here that the information transmitting unit 27 of the road-side device 20 forwards, at regular intervals, road-side device information about the road-side device 20 of its own, e.g., serial number and address of the road-side device. The road-side device information is stored in the memory 23, for example, and is read by the processing unit 25 for transmission.

Figure 4:
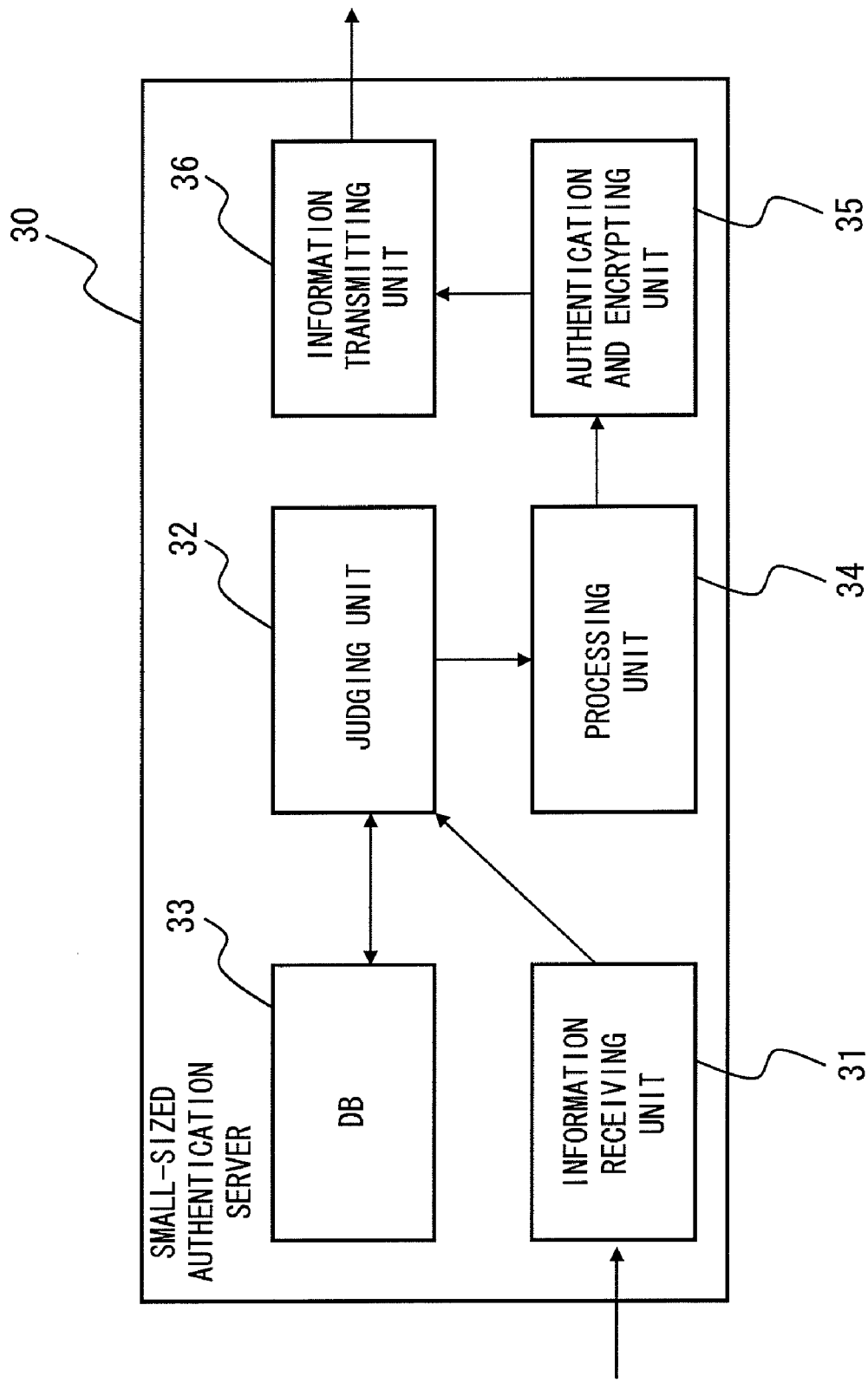
FIG. 4 illustrates an exemplary configuration of a small-sized authentication server.

FIG. 4 is a diagram illustrating an exemplary configuration of the small-sized authentication server 30. The small-sized authentication server 30 is configured to include an information receiving unit 31, a judging unit 32, a database 33, a processing unit 34, an authentication and encrypting unit 35, and an information transmitting unit 36.

The information receiving unit 31 is provided with information from the road-side device 20, e.g., a request for network entry, and vehicle-mounted device information.

The judging unit 32 determines whether or not the provided vehicle-mounted device information or others are stored in the database 33.

The database 33 stores therein the vehicle-mounted device information. The details thereof will be described later.

The processing unit 34 executes a process to the provided information and others. The authentication and encrypting unit 35 executes an authentication process and an encryption process to the provided information and others if needed. The information transmitting unit 36 forwards, to the road-side device 20, the information provided by the authentication and encrypting unit 35.

FIG. 5 is a diagram illustrating exemplary vehicle-mounted device information (authentication information) stored in the authentication server 40. The authentication server 40 serves as a database for storage of vehicle-mounted device information about every registered vehicle. For example, as illustrated in FIG. 5, the authentication server 40 stores the vehicle-mounted device information including the serial number of each vehicle, the vehicle identification number thereof, the number of vehicle-mounted device 10, the plate number of each vehicle, the time of last authentication, and the information about authentication route. In addition thereto, an IC-card driver's license number may be stored, i.e., the number of a driver's license in the form of an IC card.

FIG. 6 is a diagram illustrating exemplary vehicle-mounted device information (authentication information) stored in the database 33 of the small-sized authentication server 30. As illustrated in FIG. 6, the database 33 stores therein vehicle-mounted device information about 245 vehicle-mounted devices, for example. Comparing with the information stored in the authentication server 40, the database 33 carries the less amount of information. It means that, in comparison with a case where the authentication server 40 is in charge of the authentication process, the small-sized authentication server 30 searches any limited amount of information for the authentication information, i.e., information about the vehicle concerned, so that the authentication process can be completed at a higher speed. With the completion of the authentication at a high speed as such, the communications to be performed individually (unicast communication) in the communication system 1 is ensured by the security, thereby being able to protect the road-side device 20 from spoofing, for example.

Figure 7:
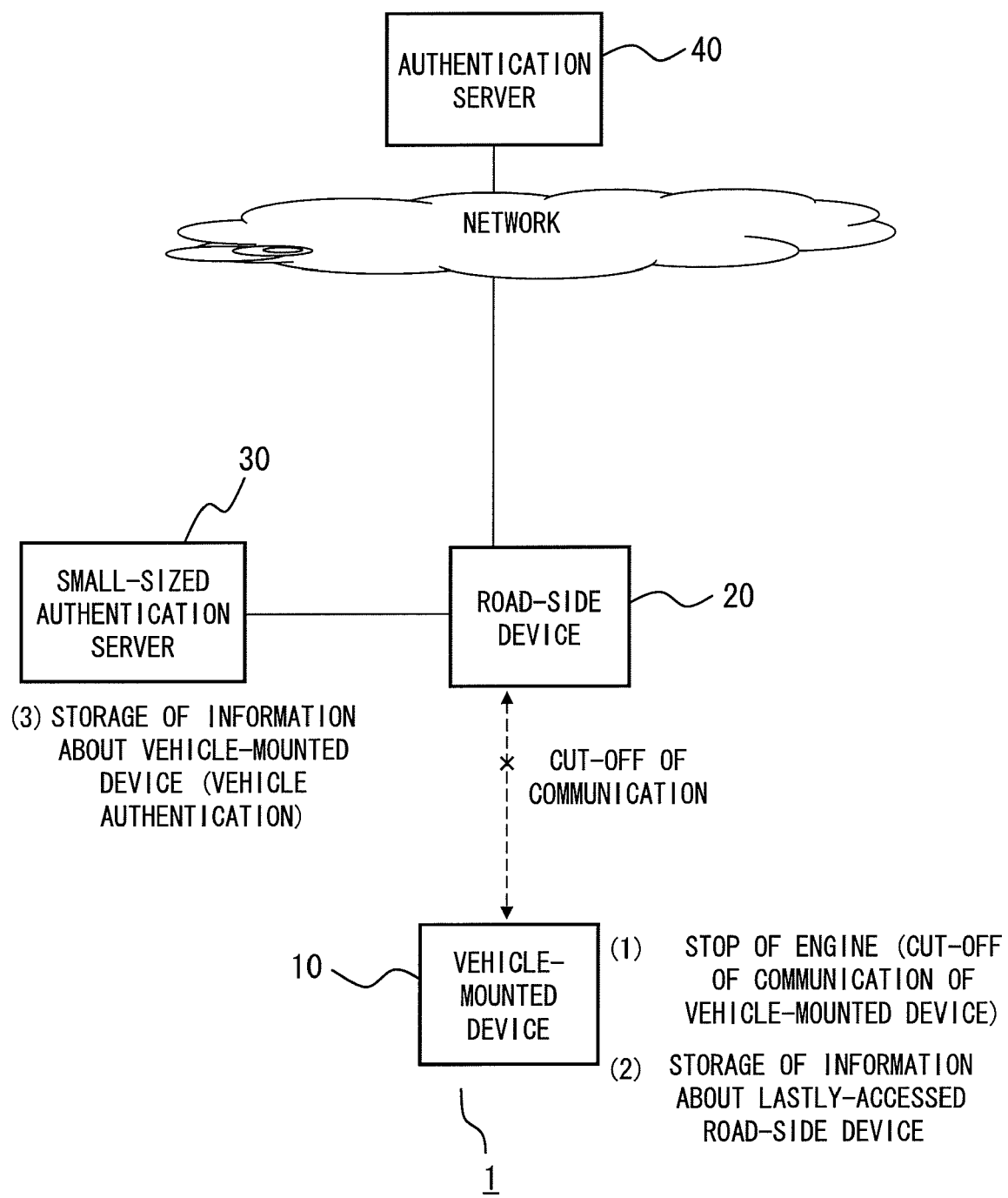
FIG. 7 illustrates an exemplary configuration of a communication system and an exemplary processing procedure when communication is cut off.

FIG. 7 is a diagram illustrating a flowchart of a process when the vehicle-mounted device 10 cuts off the communication. The vehicle-mounted device 10 cuts off the communication with the road-side device 20 by stopping the engine of the vehicle, for example. At this time, the vehicle-mounted device 10 stores lastly-accessed road-side device information. Herein, the road-side device information is the one to be provided by the road-side device 20 at regular intervals, and the lastly-accessed road-side device information is the one provided to the vehicle-mounted device 10 by the road-side device 20 just before the communication is cut off as such, for example.

On the other hand, after acquiring information from the road-side device 20 telling that the communication with the vehicle-mounted device 10 is cut off, the small-sized authentication server 30 stores the vehicle-mounted device information about the vehicle-mounted device 10. For example, the processing unit 34 of the small-sized authentication server 30 stores the vehicle-mounted device information in the database 33.

Figure 8:
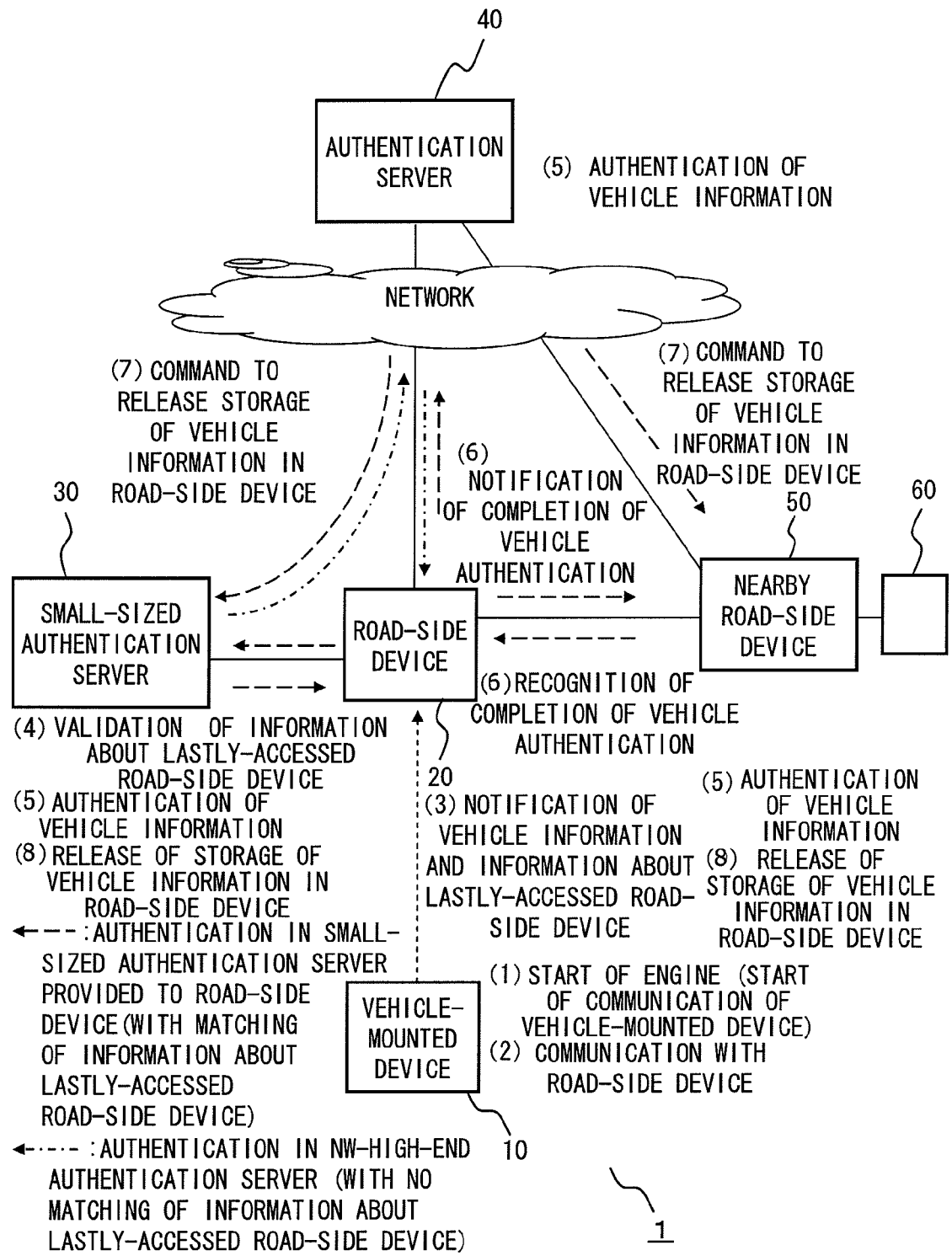
FIG. 8 illustrates an exemplary configuration of a communication system and an exemplary processing procedure when communication is started.

FIG. 8 is a diagram illustrating a flowchart of a process when the vehicle-mounted device 10 starts the communication. First of all, the vehicle-mounted device 10 starts communication with the road-side device 20 by starting the engine of the vehicle, for example.

The vehicle-mounted device 10 then notifies the road-side device 20 of the vehicle-mounted device information thereabout, and the lastly accessed road-side device information about the road-side device 20 accessed lastly (or most recently) by the vehicle-mounted device 10. The vehicle-mounted device 10 notifies also a request for network entry.

Upon reception of the vehicle-mounted device information and others, the road-side device 20 makes an inquiry about authentication by forwarding the vehicle information and others at hand to the small-sized authentication server 30.

Upon reception of the vehicle-mounted device information and others, the small-sized authentication server 30 determines whether or not the lastly-accessed road-side device information shows a match with the road-side device information about the road-side device 20. When such an information match is observed, the small-sized authentication server 30 goes through an authentication process based on the provided vehicle-mounted device information and the vehicle-mounted device information stored in the database 33. With the completion of the authentication process, the small-sized authentication server 30 makes a completion notification to the road-side device 20.

Thereafter, the road-side device 20 notifies the authentication server 40 that the vehicle authentication is now completed. The authentication server 40 then notifies the road-side device 20 and another road-side device 50, i.e., nearby road-side device 50, of a command to release the storage of the vehicle-mounted device information about the vehicle-mounted device 10 stored in the small-sized authentication server 30 and another small-sized authentication server 60.

Upon reception of such a storage release command, the road-side devices 20 and 50 each determine whether or not the vehicle-mounted device information related to the command is being in communication, and when determining that the information is not being in communication, deletes the vehicle-mounted device information concerned, from the small-sized authentication servers 30 and 50. As such, considering the communication states of all of the vehicles in the network entry, the road-side devices 20 and 50 and the authentication server 40 are all allowed to delete any vehicle-mounted device information, thereby being able to protect the vehicles from spoofing.

On the other hand, when the lastly-accessed road-side device information provided by the vehicle-mounted device 10 does not match the road-side device information about the road-side device 20, the small-sized authentication server 30 notifies the road-side device 20 as such. When a handover of any of the vehicles is in progress, the road-side device 20 forwards the vehicle-mounted device information and others thereabout to the nearby road-side device 50 being the destination of the handover. Considering that because the road-side device 20 or the small-sized authentication server 30 stores the road-side device information about a plurality of nearby road-side devices, for example, alternatively, a comparison may be made with the lastly-accessed road-side device information received using such road-side device information, and the vehicle-mounted device information may be transmitted only to any of the nearby road-side devices, i.e., nearby road-side device 50, showing an information match.

The nearby road-side device 50 may transmit the vehicle-mounted device information and others to the small-sized authentication server 60, and the small-sized authentication server 60 executes an authentication process to the vehicle concerned. With the completion of the authentication process, the notification of completion is provided to the road-side device 20 via the nearby road-side device 50.

When the lastly-accessed road-side device information provided by the vehicle-mounted device 10 does not match the road-side device information about the road-side device 20, and when no handover is in progress, the small-sized authentication server 30 makes an inquiry about authentication of the vehicle information to the authentication server 40 via the road-side device 20. With the completion of the authentication process, the authentication server 40 notifies the completion of the vehicle authentication to the road-side device 20. The authentication server 40 then issues a command to the road-side devices 20 and 50 to release the vehicle information stored in the small-sized authentication servers 30 and 60, respectively. The process at the time of the handover will be described later.

Figure 9:
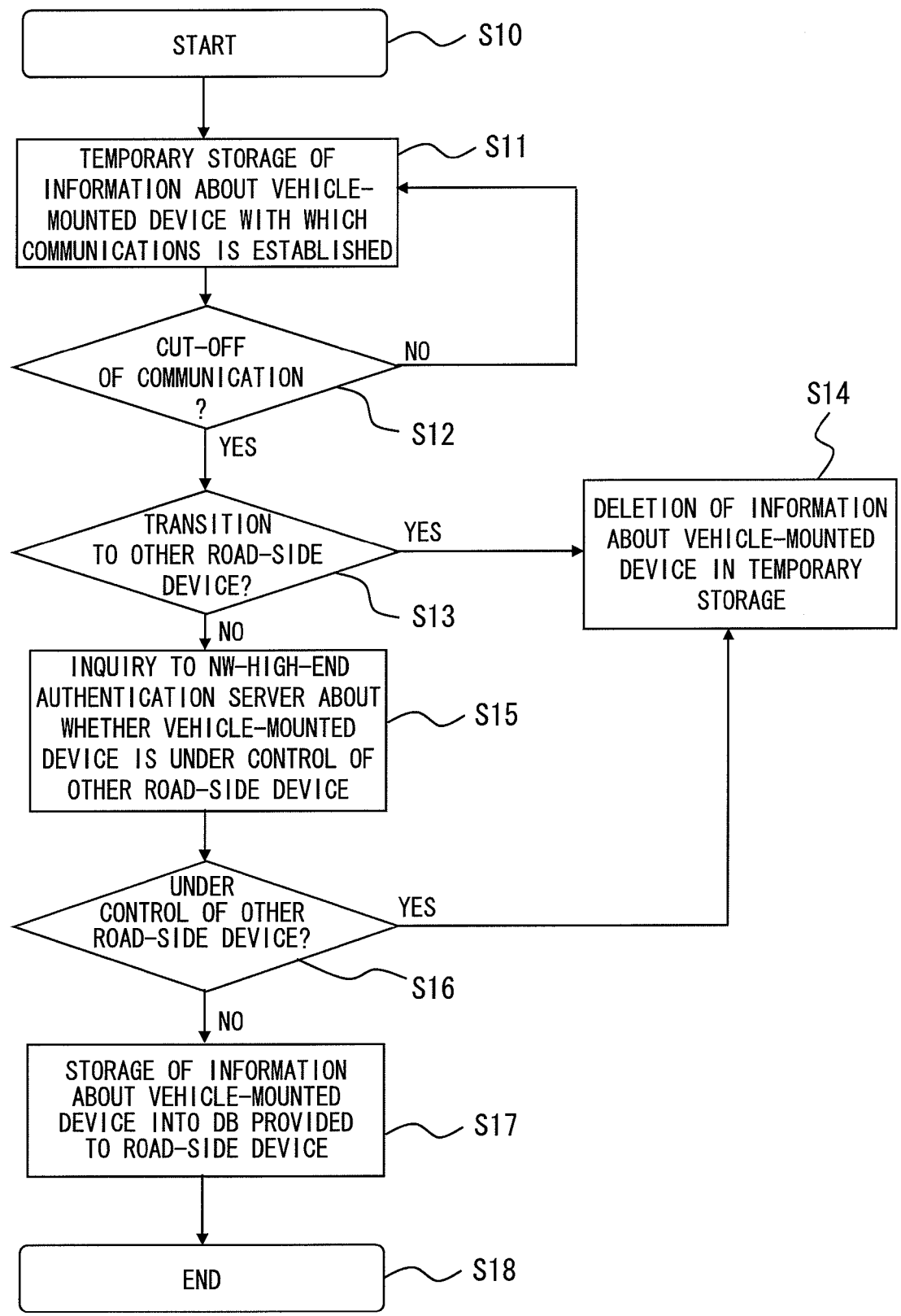
FIG. 9 illustrates a flowchart of an exemplary process of storing vehicle-mounted device information.

By referring to FIGS. 9 to 14, described next is the operation of the processes. FIG. 9 is a flowchart illustrating an exemplary process of storing the vehicle information in the road-side device 20.

When the process is started (S10), the road-side device 20 temporarily stores the vehicle-mounted device information provided by the vehicle-mounted device 10 with which the communication is being established (S11). Such vehicle-mounted device information is stored in the memory 23, for example.

The judging unit 24 of the road-side device 20 then determines, considering the communication state, whether or not the communication with the vehicle-mounted device 10 is now cut off (S12). When the communication is determined as not being cut off (No in S12), the procedure goes to the process in S11 for execution by the road-side device 20.

When the communication is determined as being cut off (Yes in S12), the judging unit 24 or the processing unit 25 determines whether or not the vehicle-mounted device 10 is now under the control of any other road-side device as a result of the handover (S13). When the handover is performed, a message of handover request or others is transmitted/received to/from the road-side devices. Therefore, the judging unit 24 or others determine whether or not the handover is now completed by reading such a message of handover request in storage.

When the handover is determined as being performed (Yes in S13), the processing unit 25 deletes the vehicle-mounted device information temporarily in storage (S14).

On the other hand, when the handover is determined as not being performed (No in S13), the processing unit 25 makes an inquiry to the authentication server 40 over the network about whether the vehicle-mounted device 10 is under the control of any other road-side device (S15).

Thereafter, based on the result of the inquiry provided by the authentication server 40, the judging unit 24 of the road-side device 20 or the processing unit 25 determines whether or not the vehicle-mounted device 10 is under the control of any other road-side device (S16). When the vehicle-mounted device 10 is determined as being under the control of any other road-side device (Yes in S16), the processing unit 25 deletes the vehicle-mounted device information thereabout temporarily in storage (S14).

On the other hand, when the vehicle-mounted device 10 is determined as not being under the control of any other road-side device (No in S16), the processing unit 25 asks the small-sized authentication server 30 to store the vehicle-mounted device information thereabout (S17). The vehicle-mounted device information is stored in the database 33 of the small-sized authentication server 30. This is the end of a series of processes (S18).

For example, when the vehicle-mounted device 10 stops the engine of its vehicle when it is in the area under the control of the road-side device 20, the determination in S12 is Yes, and the determination in S16 is No so that the road-side device 20 stores the vehicle-mounted device information about the vehicle-mounted device 10 in the small-sized authentication server 30 (S17). When the handover of the vehicle-mounted device 10 is completed (Yes in S13), or when the vehicle-mounted device 10 is moved in position by being carried by a track or others after the engine of its vehicle is stopped, and resumes the communication with any other road-side device (Yes in S16), for example, the road-side device 20 deletes the vehicle information in temporary storage (S14).

Figure 10:
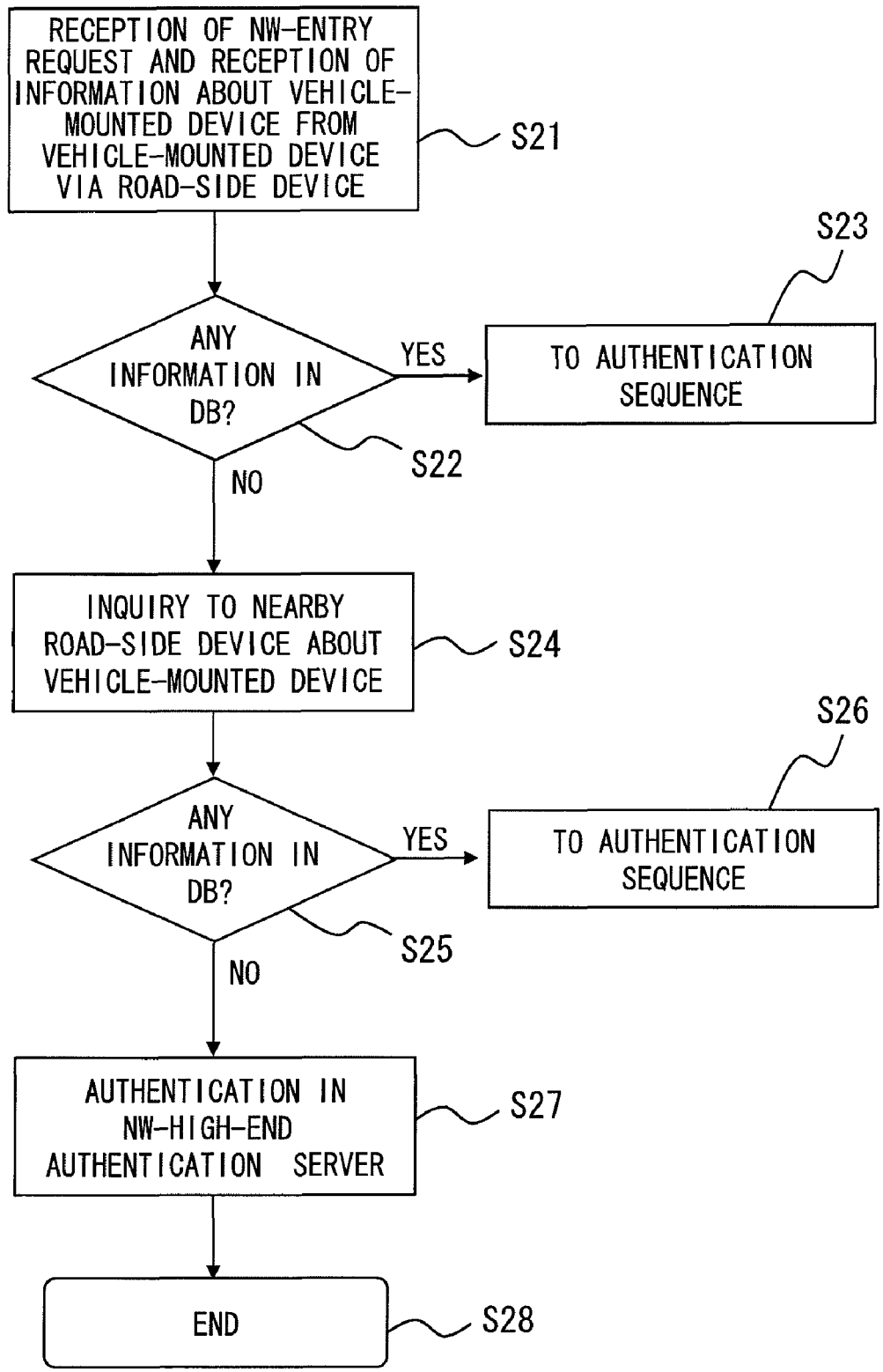
FIG. 10 illustrates a flowchart of an exemplary initial authentication process.

FIG. 10 is a flowchart of an exemplary process of initial authentication in the small-sized authentication server 30. First of all, the information receiving unit 31 is provided with a request for network entry, the vehicle-mounted device information, and the lastly-accessed road-side device information via the road-side device 20 (S21).

The judging unit 32 then determines whether or not the lastly-accessed road-side device information provided as such shows a match with the road-side device information about the road-side device 20 (S22). The judging unit 32 makes such a determination by reading the information stored in the database 33, e.g., the road-side device information and the lastly-accessed road-side device information.

When there is such an information match (Yes in S22), such information is forwarded to the authentication and encrypting unit 35 via the processing unit 34, and the authentication and encrypting unit 35 then executes the authentication process (S23).

On the other hand, when there is no such information match (No in S22), the processing unit 34 makes an inquiry about the vehicle-mounted device to the nearby road-side devices 50 (S24). At this time, the processing unit 34 forwards the vehicle-mounted device information and the lastly-accessed road-side device information to the nearby road-side devices 50 via the information transmitting unit 36.

The nearby road-side device 50 then forwards the vehicle-mounted device information or others to the small-sized authentication server 60, and the small-sized authentication sever 60 determines whether or not there is a match between the lastly-accessed road-side device information provided as such and the lastly-accessed road-side device information stored about the vehicle-mounted device 10 (S25).

When there is such an information match (Yes in S25), the small-sized authentication server 60 goes though the authentication sequence (S26).

On the other hand, when there is no such information match (No in S25), such a notification is provided to the small-sized authentication server 30 via the road-side devices 20 and 50, and the small-sized authentication server 30 forwards the vehicle-mounted device information or others to the authentication server 40. The vehicle carrying the vehicle-mounted device 10 is authenticated by the authentication server 40 (S27). This is the end of a series of processes (S28).

Figure 11:
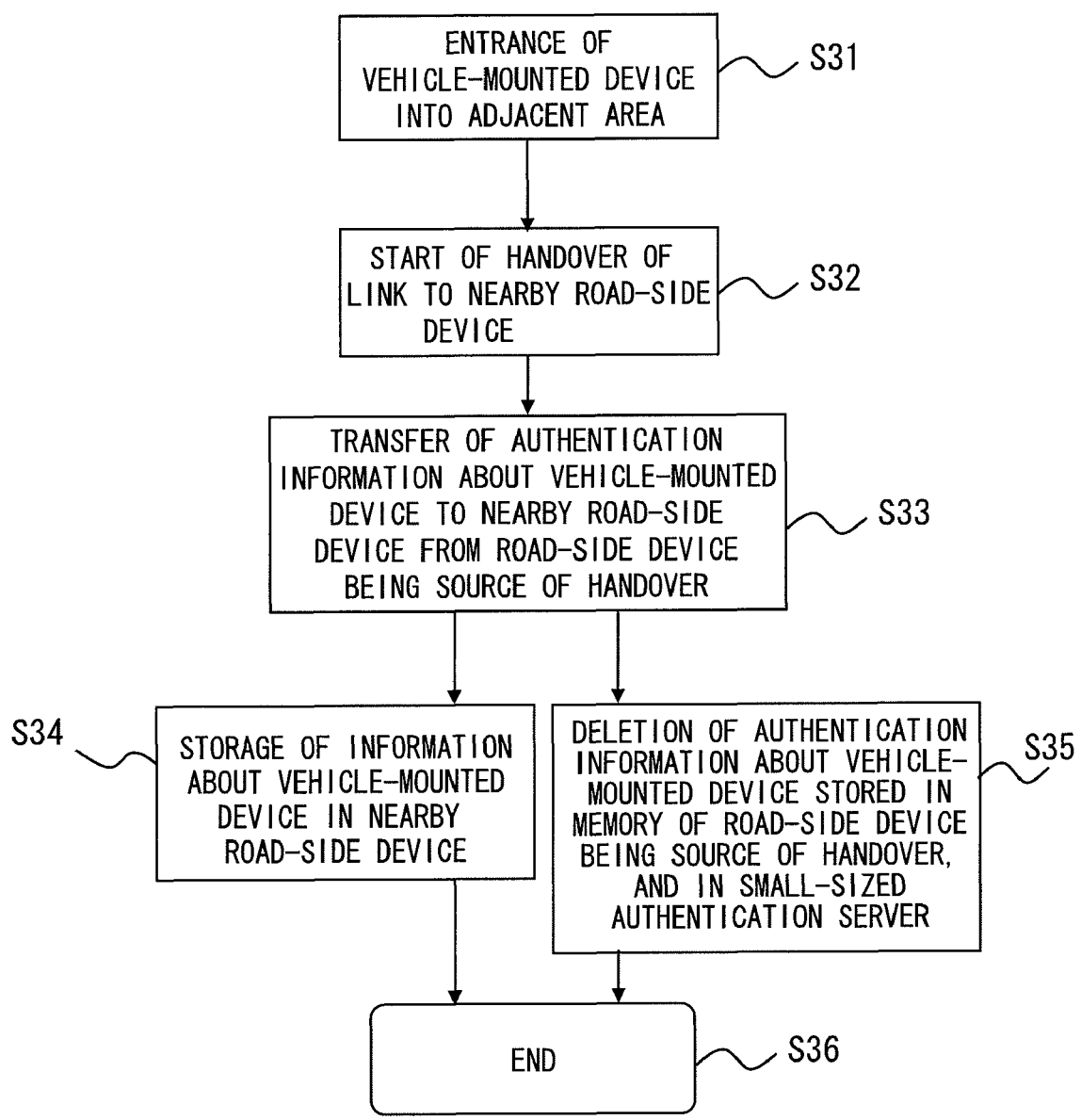
FIG. 11 illustrates a flowchart of an exemplary handover process when communication areas are close to each other.
Figure 12:
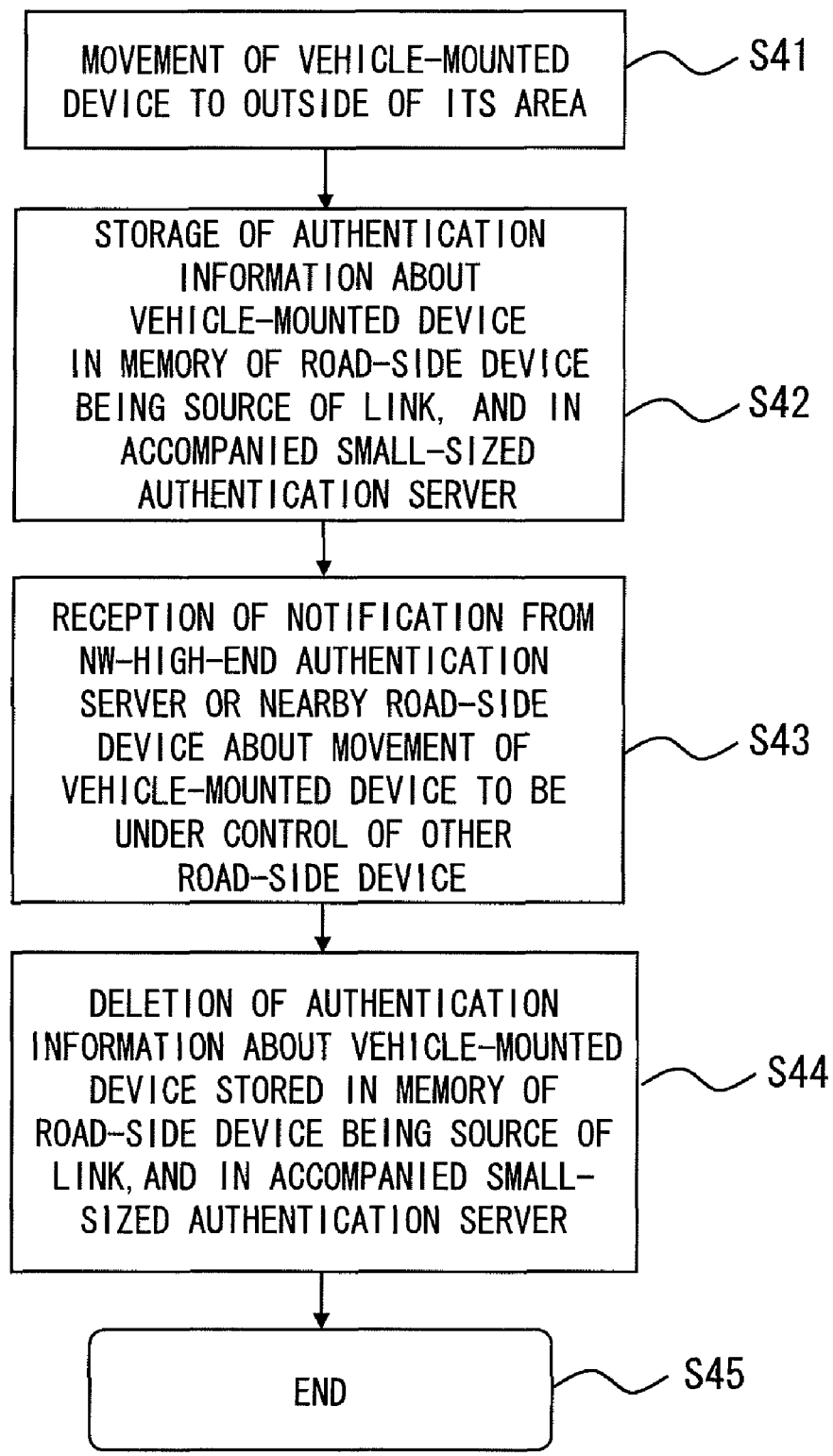
FIG. 12 illustrates a flowchart of an exemplary handover process when the communication areas are not close to each other.

FIGS. 11 and 12 are each a flowchart of an exemplary handover process. FIG. 11 shows an exemplary case where the communication areas are close to each other, and FIG. 12 shows an exemplary case where the communication areas are not close to each other.

As shown in FIG. 11, the vehicle-mounted device 10 enters into the communication area of the nearby road-side device 50, which is adjacent to the communication area of the road-side device 20 (S31). This accordingly starts the process.

The vehicle-mounted device 10 is then subjected to the handover to the communication area under the control of the nearby road-side device 50 (S32).

The road-side device 20 being the source of the handover then transfers the vehicle-mounted device information about the vehicle-mounted device 10 to the nearby road-side device 50 (S33). That is, the small-sized authentication server 30 reads the vehicle-mounted device information about the vehicle-mounted device in the vehicle from the database 33 for transmission to the road-side device 20, for example. The information is then transferred to the nearby road-side device 50 from the processing unit 25 of the road-side device 20 via the information transmitting unit 27.

The nearby road-side device 50 then stores the transferred vehicle-mounted device information in the small-sized authentication server 60 (S34). The road-side device 20 then deletes the vehicle-mounted device information transferred as such about the vehicle-mounted device 10 from the memory 23 or the database 33 of the small-sized authentication server 30 (S35). This is the end of a series of processes (S36).

When the communication areas are not close to each other, if the vehicle-mounted device 10 is moved to the outside of the communication area of the road-side device 20 (S41), the road-side device 20 stores the vehicle-mounted device information about the vehicle-mounted device 10 in the memory 23 and the small-sized authentication server 30 (S42).

Thereafter, assuming that the vehicle-mounted device 10 is moved to the communication area of the nearby road-side device 50, the road-side device 20 is notified by the authentication server 40 or the nearby road-side device 50 that the vehicle-mounted device 10 is now moved to the communication area under the control of the nearby road-side device 50 (S43).

The road-side device 20 then deletes the vehicle-mounted device information stored in the memory 23 and the small-sized authentication server 30 (S44). This is the end of a series of processes (S45).

Figure 13:
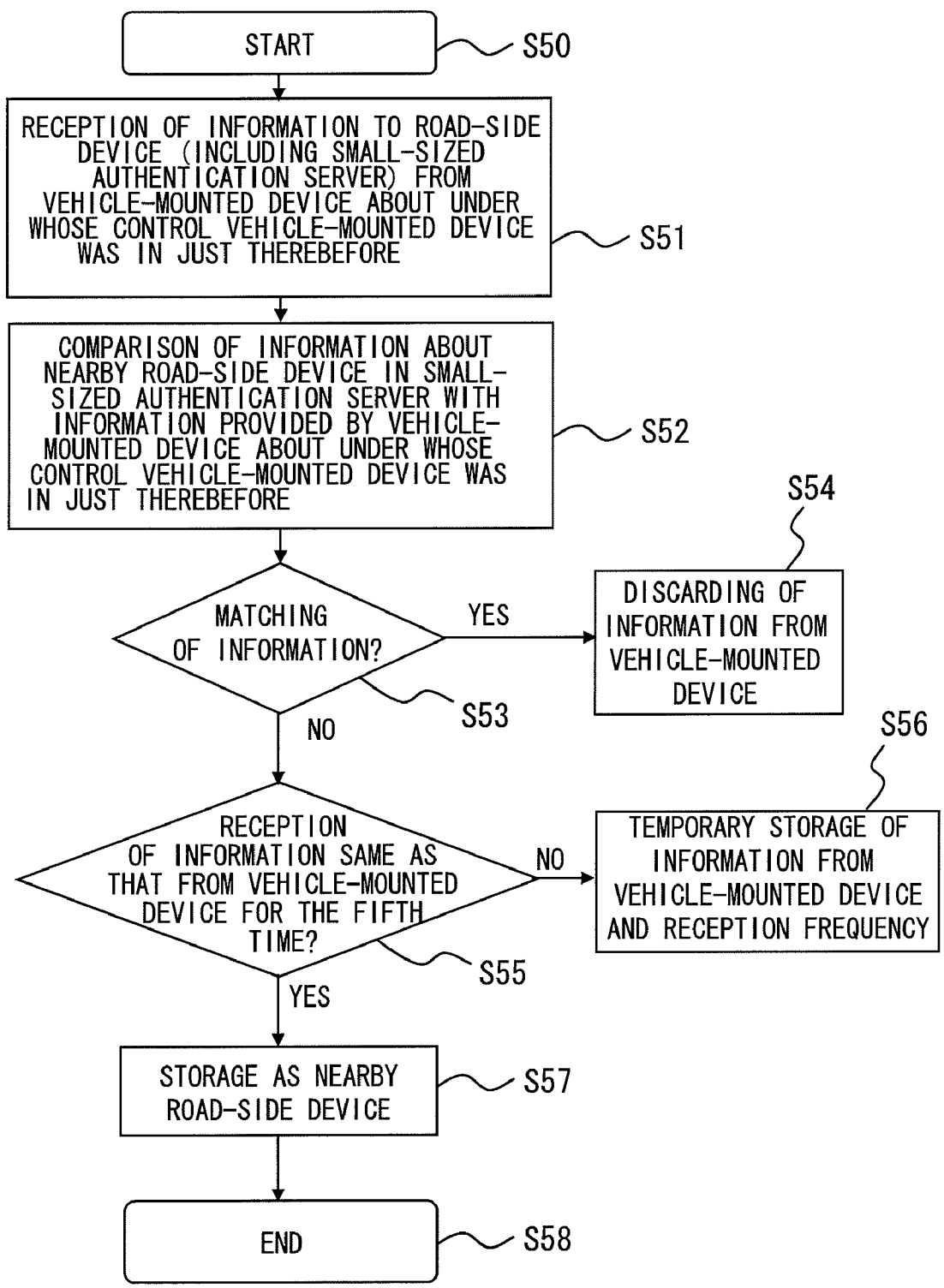
FIG. 13 illustrates a flowchart of an exemplary process when a nearby road-side device is additionally provided.

FIG. 13 is a flowchart of an exemplary process when the road-side device 20 additionally provides any other road-side device as a nearby road-side device. This is specifically a case where the road-side device 20 newly registers any other road-side device as a nearby road-side device, e.g., any new road is open, or a large number of vehicles come from the side across the river again and again by a ferry, for example. The following process is executed by the judging unit 24 or the processing unit 25 of the road-side device 20, or by the judging unit 32 or the processing unit 34 of the small-sized authentication server 30, for example.

When the process is started (S50), the road-side device 20 (including the small-sized authentication server 30) is provided with, by the vehicle-mounted device 10, the road-side device information about the road-side device under whose control the vehicle-mounted device 10 was in just therebefore (S51). Assuming that the vehicle-mounted device 10 is moved to the communication area under the control of the road-side device 20 from the communication area under the control of the nearby road-side device 50, the road-side device 20 is provided with the road-side device information about the nearby road-side device 50.

The road-side devices 20 or others then make a comparison between information about the nearby road-side device, i.e., nearby road-side device information, stored in the small-sized authentication server 30 and the road-side device information provided by the vehicle-mounted device 10 (S52). Herein, such nearby road-side device information is stored in the database 33 or the memory 23, for example.

When there is such an information match (Yes in S53), the road-side device 20 or others discard the nearby road-side device information provided by the vehicle-mounted device 10 because the road-side device information provided by the vehicle-mounted device 10 has been already registered as the nearby road-side device information (S54).

On the other hand, when there is no such information match (No in S53), the road-side device 20 or others then determine whether the frequency of receiving any same nearby road-side device information from the vehicle-mounted device 10 is of a threshold value or more, e.g., fifth time or more (S55).

When the frequency is not yet of the threshold value or more (No in S55), the road-side device 20 or others temporarily store the nearby road-side device information provided by the vehicle-mounted device 10, and the frequency of information reception in the memory 23 or others (S56).

On the other hand, when the frequency is of the threshold value or more (Yes in S55), the road-side device 20 or others store the road-side device information provided as such as the nearby road-side device information for the purpose of registering the road-side device as a new nearby road-side device (S57). The nearby road-side device information is stored in the memory 23 of the road-side device 20, or in the database 33 of the small-sized authentication server 30, for example. This is the end of a series of processes (S58).

Figure 14:
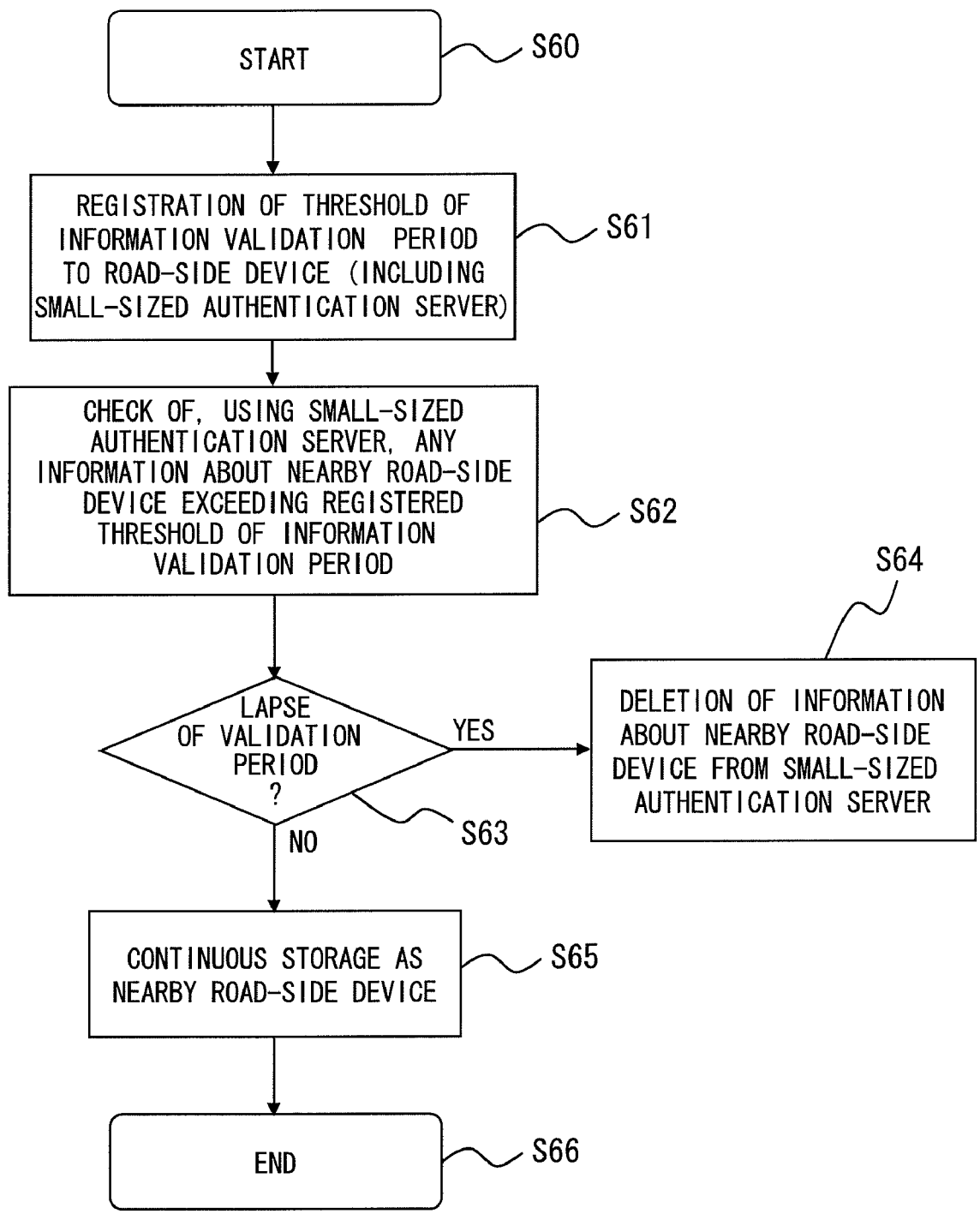
FIG. 14 illustrates a flowchart of an exemplary process when a nearby road-side device is removed.

FIG. 14 is a flowchart of an exemplary process of deleting the nearby road-side device information stored in the road-side device 20 as a result of sorting of information. This is an example of deleting, by the road-side device 20, the setting made before to regard the road-side device 50 as a nearby road-side device due to the reason of the removal of the road-side device 50, e.g., the closing of a road. The following process is executed also by the judging unit 24 or the processing unit 25 of the road-side device 20, or by the judging unit 32 or the processing unit 34 of the small-sized authentication server 30, for example.

When the process is started (S60), the road-side device 20 (or including the small-sized authentication server 30) registers a threshold value to a period of time for information validation (S61). The resulting threshold value is stored in the memory 23 of the road-side device 20 or in the database 33 of the small-sized authentication server 30, for example.

Thereafter, the road-side device 20 determines whether or not there is a match between the road-side device information about the nearby base station stored in the memory 23 or others during the period of time of the threshold value and the lastly-accessed road-side device information provided by the vehicle-mounted device 10 (S62). That is, for such a determination, the judging unit 32 or the processing unit 34 of the small-sized authentication server 30 reads the threshold value from the memory 23 or the database 33, for example.

When there is no such information match during the period of time of the threshold value (Yes in S63), the small-sized authentication server 30 deletes the nearby road-side device information. That is, the judging unit 32 or the processing unit 34 deletes the nearby road-side device information from the database 33, for example.

On the other hand, when there is such an information match during the period of time of the threshold value (No in S63), the small-sized authentication server 30 continuously stores the nearby road-side device information (S65). This is the end of a series of processes (S66).

When the road-side device information about the road-side device registered as the nearby road-side device information does not come from the vehicle-mounted device 10 for a while (Yes in S63), for example, the road-side device 20 eliminates the road-side device from the registration list of the nearby road-side devices (S64).

Figure 15:
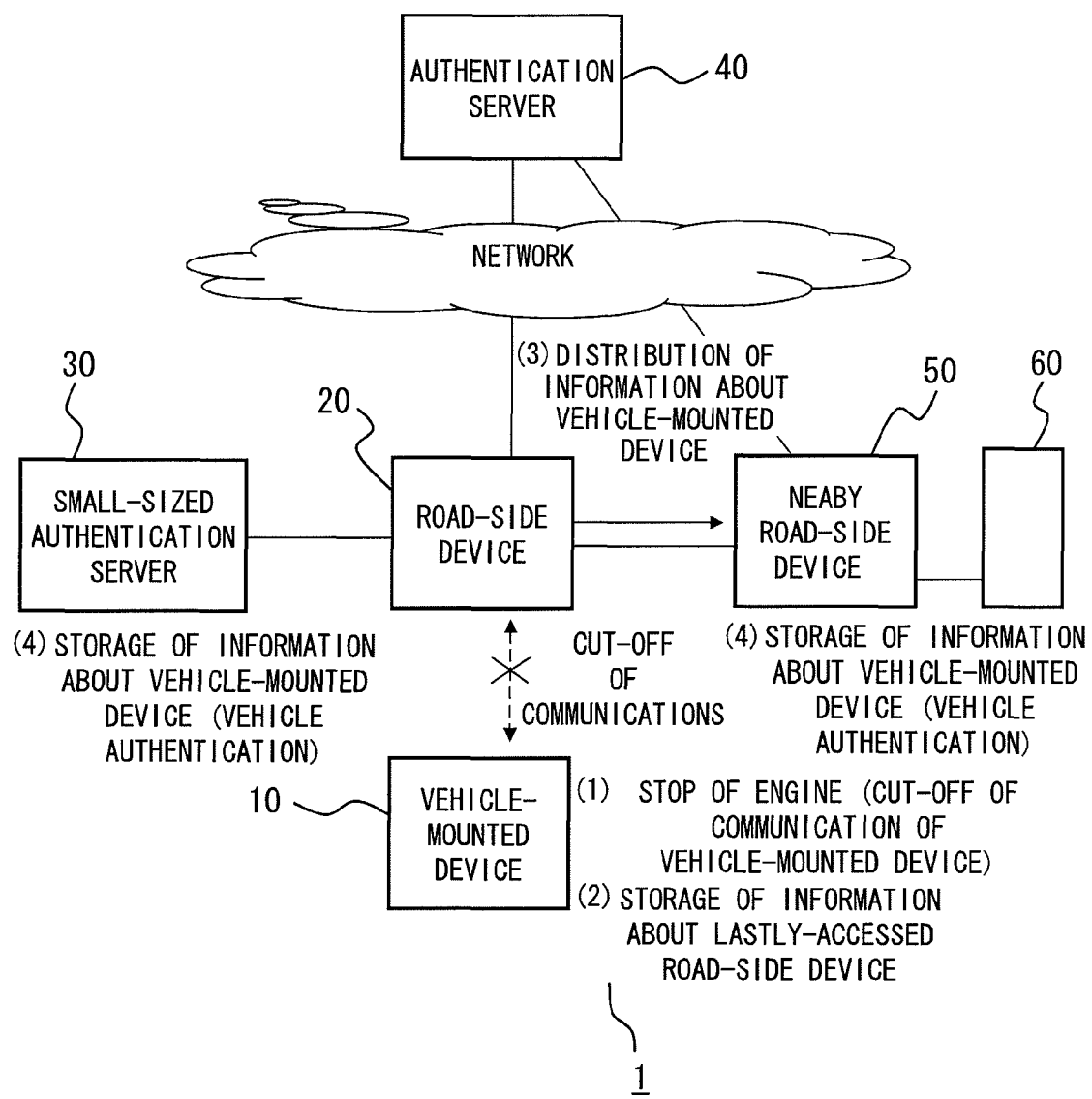
FIG. 15 illustrates an exemplary communication system and an exemplary process when communication with an emergency vehicle is cut off.

FIG. 15 is a flowchart of a process when an emergency vehicle cuts off the communication.

The vehicle-mounted device 10 cuts off the communication with the road-side device 20 by stopping the engine of the vehicle, for example, and stores the road-side device information about the road-side device 20 as the lastly-accessed road-side device information.

On the other hand, when the communication with the vehicle-mounted device 10 is cut off, the road-side device 20 makes the small-sized authentication server 30 to store therein the vehicle-mounted device information about the vehicle-mounted device 10. The road-side device 20 then forwards the vehicle-mounted device information to the nearby road-side device 50, thereby making the small-sized authentication server 60 to store therein the vehicle-mounted device information.

Assuming here is a case where, after the engine of an emergency vehicle is stopped in the communication area under the control of the road-side device 20, the emergency vehicle is moved in position by being carried by a track or others, and resumes the communication with any of the nearby road-side devices 50. In this case, because the vehicle-mounted device information about the emergency vehicle is stored in the small-sized authentication server 60 of the nearby road-side device 50, the emergency vehicle can be provided with services faster than when receiving the vehicle-mounted device information from the road-side device 20. In this case, alternatively, the vehicle-mounted device information of the emergency vehicle may be provided to any other road-side devices other than the nearby road-side device 50.

The process in a case where the vehicle-mounted device 10 such as emergency vehicle starts communications is illustrated in FIG. 8, for example.

In any of the examples described above, as an alternative configuration, the small-sized authentication servers 30 and 60 may be provided inside of the road-side devices 20 and 50, respectively. For example, the memory 23 of each of the road-side devices 20 and 50 may store therein the vehicle-mounted device information as does the database 33, and the authentication and encrypting unit 26 may execute the authentication process similarly to the small-sized authentication servers 30 and 60.

According to the embodiment described above, the authentication process can be completed in a shorter time.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication system that performs radio communication between a plurality of vehicle-mounted terminal devices and a base station device, wherein the base station device includes:

a transmitting unit that transmits identification information of the base station device;

a storage unit that stores partial vehicle-mounted device information of the vehicle-mounted terminal devices;

a receiving unit that receives, from a vehicle-mounted terminal device, vehicle-mounted device information of the vehicle-mounted terminal device, and lastly-accessed identification information indicating a base station device that was in radio communication with the vehicle-mounted terminal device just before when radio communication therewith is cut off; and a processing unit that performs, when there is a match between the lastly-accessed identification information and identification information in the storage unit, an authentication based on the received vehicle-mounted device information and the partial vehicle-mounted device information stored in the storage unit, and each of the plurality of vehicle-mounted terminal devices includes:
- a receiving unit that receives the identification information of the base station device; and
- a transmitting unit that transmits the vehicle-mounted device information and the lastly-accessed identification information to the base station device.

2. The communication system according to claim 1, wherein the plurality of vehicle-mounted terminal devices are each further provided with an other storage unit that stores, when the radio communication with the base station device is cut off, the identification information of the base station device as the lastly-accessed identification information, and
when the radio communication with any of the vehicle-mounted terminal devices is cut off, the processing unit of the base station device stores the vehicle-mounted device information about the vehicle-mounted terminal device in the storage unit.

3. The communication system according to claim 1, wherein
when there is not the match between the lastly-accessed identification information and the identification information in the storage unit, the processing unit of the base station device transmits, from the transmitting unit of the base station device to another base station device, the lastly-accessed identification information and the vehicle-mounted device information.

4. The communication system according to claim 1, wherein
when the lastly-accessed identification information is different from identification information about an other base station device, the processing unit of the base station device transmits, to a high-end authentication server connected to the base station device, the vehicle-mounted device information from the transmitting unit of the base station device.

5. The communication system according to claim 1, wherein
when receiving an information release command from a high-end authentication server connected to the base station device, the processing unit of the base station device determines whether or not any of the vehicle-mounted terminal devices carrying the vehicle-mounted device information being a target of the information release command is in communication, and when determining that the vehicle-mounted terminal device is not in communication, deletes the vehicle-mounted device information being the target of the information release command from the storage unit.

6. The communication system according to claim 1, wherein
when any of the vehicle-mounted terminal devices stops the radio communication, the processing unit of the base station device transmits the vehicle-mounted device information from the transmitting unit of the base station device to another base station device.

7. The communication system according to claim 1, wherein
the transmitting unit of each of the vehicle-mounted terminal devices transmits identification information about an other base station device with which the radio communication is performed before the radio communication with the base station device, and
when there is no match between the identification information about the other base station device and identification information about a nearby base station stored in the storage unit, and when the identification information about the other base station device is received for a threshold number of times, the processing unit of the base station device stores the identification information about the other base station device in the storage unit as the nearby base station.

8. The communication system according to claim 1, wherein
when there is no match between the lastly-accessed identification information and identification information about a nearby base station stored in the storage unit during a period of a threshold value, the processing unit of the base station device deletes the identification information about the nearby base station stored in the storage unit.

9. The communication system according to claim 8, wherein
when there is the match between the lastly-accessed identification information and the identification information about the nearby base station, the processing unit of the base station device continuously stores the identification information about the nearby base station stored in the storage unit.

10. The communication system according to claim 1, wherein the base station device is a road-side device.

11. The communication system according to claim 10, wherein the vehicle-mounted device information is a vehicle identification number of a vehicle carrying one of the plurality of vehicle-mounted terminal devices, a plate number of the vehicle, a driver's license number, or a number of the one vehicle-mounted terminal device for distinguishing the one vehicle-mounted terminal device from others of the plurality of vehicle-mounted terminal devices.

12. The communication system according to claim 1, wherein the base station device further includes with a small-sized authentication server, and the small-sized authentication server is provided with the storage unit and the processing unit of the base station device.

13. A base station device that performs radio communication with a plurality of vehicle-mounted terminal devices, comprising:
- a transmitting unit that transmits identification information of the base station device;
- a storage unit that stores partial vehicle-mounted device information of the vehicle-mounted terminal devices;
- a receiving unit that receives, from a vehicle-mounted terminal device, vehicle-mounted device information of the vehicle-mounted terminal device, and lastly-accessed identification information indicating a base station device that was in communication with the vehicle-mounted terminal device just before when communication therewith is cut off; and
- a processing unit that performs, when there is a match between the received lastly-accessed identification information and identification information in the storage unit, an authentication based on the received vehicle-mounted device information and the partial vehicle-mounted device information in the storage unit.

14. A communication method for use in a communication system that performs radio communication between a plurality of vehicle-mounted terminal devices and a base station device, the method comprising:
transmitting, by each of the vehicle-mounted terminal devices, vehicle-mounted device information thereof, and lastly-accessed identification information indicating a base station device that was in radio communication with the each vehicle-mounted terminal device just before when the radio communication therewith is cut off; and
authenticating, by the base station device, when there is a match between the transmitted lastly-accessed identification information and identification information of a base station device stored in the base station device, based on partial vehicle-mounted device information of a corresponding one of the plurality of vehicle-mounted terminal devices stored in the base station device, and the vehicle-mounted device information transmitted by the one vehicle-mounted terminal device.

* * * * *